(12) United States Patent
Finney et al.

(10) Patent No.: US 7,834,853 B2
(45) Date of Patent: Nov. 16, 2010

(54) HANDSET KEYPAD

(75) Inventors: Mark D. Finney, Chicago, IL (US); Steve C. Emmert, Crystal Lake, IL (US)

(73) Assignee: Motorola, Inc., Schaumburg, IL (US)

(*) Notice: Subject to any disclaimer, the term of this patent is extended or adjusted under 35 U.S.C. 154(b) by 915 days.

(21) Appl. No.: 11/459,446

(22) Filed: Jul. 24, 2006

(65) Prior Publication Data
US 2008/0037765 A1 Feb. 14, 2008

(51) Int. Cl.
G09G 5/00 (2006.01)

(52) U.S. Cl. .............. 345/169; 345/168; 345/173; 455/556.1; 455/556.2; 455/575.7; 455/575.8; 341/20; 341/21; 341/22; 463/37; 200/5 A; 200/521; 200/513

(58) Field of Classification Search .......... 345/168–178; 455/556.1, 556.2, 575.1, 575.8; 341/20–22; 463/37; 200/5 A, 521, 513
See application file for complete search history.

(56) References Cited

U.S. PATENT DOCUMENTS

| | | | |
|---|---|---|---|
| 4,224,615 A | 9/1980 | Penz | |
| 4,420,748 A | 12/1983 | Jurgen | |
| 4,449,839 A | 5/1984 | Bleuer | |
| 4,492,829 A * | 1/1985 | Rodrique | 200/5 A |
| 5,557,299 A * | 9/1996 | Maynard et al. | 345/168 |
| 5,748,185 A * | 5/1998 | Stephan et al. | 345/173 |
| 6,052,464 A | 4/2000 | Harris et al. | |
| 6,101,253 A | 8/2000 | Lee et al. | |
| 6,239,790 B1 * | 5/2001 | Martinelli et al. | 345/174 |
| 6,462,294 B2 * | 10/2002 | Davidson et al. | 200/512 |
| 6,911,608 B2 * | 6/2005 | Levy | 200/5 A |
| 6,931,125 B2 * | 8/2005 | Smallwood | 379/433.07 |
| 6,947,545 B2 * | 9/2005 | Adams | 379/368 |
| 7,005,588 B2 * | 2/2006 | Pihlaja | 200/5 A |
| 7,181,007 B2 * | 2/2007 | Gremo et al. | 379/433.07 |
| 7,345,250 B2 * | 3/2008 | Hakunti et al. | 200/5 A |
| 7,379,053 B2 * | 5/2008 | Schaefer | 345/173 |

(Continued)

FOREIGN PATENT DOCUMENTS

EP 1460821 A2 9/2004

(Continued)

OTHER PUBLICATIONS

Sony Reader Specifications; from http://products.sel.sony.com; p. 1.

(Continued)

*Primary Examiner*—Richard Hjerpe
*Assistant Examiner*—Gregory J Tryder
(74) *Attorney, Agent, or Firm*—Vedder Price P.C.

(57) ABSTRACT

A keypad (1200) includes a plurality of keys (1202) and a plurality of key dividers (1204-1210) wherein each of the key dividers includes a plurality of raised guide portions (1212-1214) and at least one tactile cue portion (1214) that is interposed between the plurality of raised guide portions (1212-1214). In one example, the keypad (1200) is a bell keypad and is made up of an elastomeric substrate (44) that includes the key dividers (1212-1214), a keypad dome array (48) that supports the silicone substrate (44) and a keypad sheet (36), such as a top sheet of a front assembly, having keypad indicia thereon and slots operatively sized to receive the plurality of key dividers.

1 Claim, 11 Drawing Sheets

U.S. PATENT DOCUMENTS

| | | | |
|---|---|---|---|
| 7,433,719 B2 * | 10/2008 | Dabov | 455/575.1 |
| 2001/0003539 A1 * | 6/2001 | Hahm et al. | 379/368 |
| 2003/0083020 A1 | 5/2003 | Langford | |
| 2003/0119543 A1 | 6/2003 | Kfoury et al. | |
| 2004/0127270 A1 | 7/2004 | Wulff et al. | |
| 2004/0132504 A1 | 7/2004 | Hague et al. | |
| 2004/0155870 A1 * | 8/2004 | Middleton | 345/173 |
| 2004/0255081 A1 | 12/2004 | Arnouse | |
| 2005/0014537 A1 | 1/2005 | Gammon et al. | |
| 2005/0024240 A1 * | 2/2005 | Fyke et al. | 341/22 |
| 2005/0101875 A1 | 5/2005 | Semler et al. | |
| 2005/0138972 A1 | 6/2005 | Park | |
| 2005/0186931 A1 | 8/2005 | Laiho et al. | |
| 2005/0248537 A1 * | 11/2005 | Kim et al. | 345/168 |
| 2005/0282593 A1 | 12/2005 | Spence et al. | |
| 2006/0068856 A1 | 3/2006 | Zhu et al. | |
| 2006/0097035 A1 | 5/2006 | Castaneda et al. | |
| 2006/0160585 A1 | 7/2006 | Miyagawa et al. | |
| 2007/0247429 A1 * | 10/2007 | Westerman | 345/168 |
| 2007/0275751 A1 * | 11/2007 | Yu et al. | 455/550.1 |
| 2008/0019502 A1 | 1/2008 | Emmert et al. | |
| 2008/0037769 A1 | 2/2008 | Emmert et al. | |
| 2008/0037770 A1 | 2/2008 | Emmert | |
| 2008/0037771 A1 | 2/2008 | Black et al. | |

FOREIGN PATENT DOCUMENTS

| WO | 03/096160 A2 | 11/2003 |
|---|---|---|
| WO | 2005/041232 A1 | 5/2005 |

OTHER PUBLICATIONS

PRS-500 'E-Reader' (Sony @ CES 2006); from www.atraclife.com; Jan. 19, 2006; pp. 1-3.

Sony Reader details and pics; from www.engadget.com; posted Jan. 6, 2006; p. 1.

Live shot of The Reader, Sony's new e-ink e-book reader; from www.engadget.com; posted Jan. 4, 2006; p. 1.

Sony to announce US e-book reader; from www.engadget.com; posted Dec. 29, 2005; p. 1.

Photos of: Vertu "Signature" phone; Mago Luxury Smart Phone; and PEBL keypad; 2 pages.

International Search Report dated Mar. 3, 2008 for PCT Application No. PCT/US07/73122, pp. 1-7.

International Search Report dated Feb. 19, 2008 for PCT Application No. PCT/US07/73030, pp. 1-10.

International Search Report dated Sep. 8, 2008 for PCT Application No. PCT/US07/73094, pp. 1-7.

International Preliminary Report on Patentability; PCT Application No. PCT/US2007/073122; dated Jan. 27, 2009.

International Preliminary Report on Patentability; PCT Application No. PCT/US2007/073030; dated Jan. 27, 2009.

International Preliminary Report on Patentability; PCT Application No. PCT/US2007/073094; dated Jan. 27, 2009.

EP Search Report; EP Application No. 07840382.1; dated Dec. 15, 2009.

* cited by examiner

US 7,834,853 B2

HANDSET KEYPAD

RELATED CO-PENDING APPLICATIONS

This application is related to co-pending applications entitled "HANDSET DEVICE WITH LAMINATED ARCHITECTURE", filed on Jul. 24, 2006, having Ser. No. 11/459,460, having inventor Steve Emmert, owned by instant Assignee and Is incorporated herein by reference; and "USER INTERFACE SUBSTRATE FOR HANDSET DEVICE", filed on Jul. 24 2006, having Ser. No. 11/459,451, having inventors Steve Emmert and John Boos, owned by instant Assignee and is incorporated herein by reference.

FIELD OF THE INVENTION

The invention relates generally to keypads, and more particularly to, keypads that include tactile cues.

BACKGROUND OF THE INVENTION

By way of example, the expansion of the cellular coverage in emerging markets requires phone designs that are very low cost in both material and conversion cost. Furthermore, success in these markets will require phone designs that are compelling and competitive in terms of design, proportions and appearance. Existing low cost phone designs typically use design approaches that have additional major housing components and internal component stacking that result in increased thickness.

Common methods of phone construction typically incorporate separate display module assemblies and printed circuit board assemblies, loaded into a housing assembly that includes a back cover and a front cover typically secured with screws, snap fit parts, or similar interlocking means. Using multiple separate sub-module assemblies and housing structures can be expensive compared with low cost product demands of consumers.

Also, the telephone microphone audio port and the front and rear speaker ports must be well sealed. If the seals are broken there might be an unwanted path from speaker to microphone which causes unwanted echo sounds, or the loudness and frequency response could be affected. In conventional phones the front housing is used to seal the phone, but this approach adds cost and size to the phone.

Keypads are known to be used in many types of devices, including but not limited to, handheld devices such as cell phones, non-handheld devices such as desktop phones, and any other device that employs keys as part of a user interface. Problems can arise with keypad usability in mobile devices and other devices where, for example, a user is not looking at the keypad. Some handset devices are known that include bell keypad layouts that include the numbers 0-9 in addition to other function keys such as "send" keys and other function keys and include tactile key dividers. One example may be found on the PEBL™ flip phone sold by Motorola, Inc. Such phones may include raised silicone portions that are in s-curve shapes and corresponding mirrored s-curve shapes. The two shapes are separated down the center of the keypad such that non-horizontal numbers 1, 5 and 3 are surrounded by a plurality of the s-curve and mirrored s-curve raised silicone protrusions. As such, the raised protrusions may be in a parallel orientation above and below non-horizontal keypad numbers 1, 5 and 3 with a space between the s-portion and mirrored s-portion centered below center number of the phone such as numbers 2, 5, 8 and 0. This configuration can assist a user when they are not looking at the phone to provide suitable vertical tactile separation between numbers in a vertical direction. In a horizontal direction however since the raised silicone portion is curved a user may inadvertently slip down to a next row of numbers instead of selecting the number in the horizontal row. For example, numbers in the horizontal row 1, 2 and 3 versus numbers in the second horizontal row 4, 5 and 6 can potentially be inadvertently selected since the raised tactile separations curve down and between horizontal rows.

Other keypad designs are known which use, for example, the keys themselves such as raised thin buttons that extend in a straight line horizontally. However, since the raised portion serves as the key and since the raised portions are horizontally straight across, it can be difficult to distinguish horizontally which number is being selected without looking at the phone. Other designs are also known which employ raised depressible button that are configured in a "v" shape in a horizontal line configuration. However, as with the type above, these raised sections are the keys themselves and can require separate components for each of the keys resulting in separate pieces potentially increasing the cost of the device, increasing the manufacturing complexity of the device and decreasing the reliability of the device.

Accordingly, a need exists for an improved keypad.

BRIEF DESCRIPTION OF THE DRAWINGS

The invention will be more readily understood in view of the following description when accompanied by the below figures and wherein like reference numerals represent like elements.

DETAILED DESCRIPTION OF THE PRESENT EMBODIMENTS

Briefly, a keypad includes a plurality of keys and a plurality of key dividers wherein each of the key dividers includes a plurality of raised guide portions and at least one tactile cue portion that is interposed between the plurality of raised guide portions. In one example, the keypad is a bell keypad and is made up of an elastomeric sheet that includes the key dividers, a keypad dome array that supports the silicone sheet and a keypad sheet, such as a top sheet of a front assembly, having keypad indicia thereon and slots operatively sized to receive the plurality of key dividers.

The tactile cue portions can be either recessed or raised with respect to the plurality of adjacent raised guide portions. In one example, a plurality of key dividers are arced and are positioned with respect to the plurality of keys wherein each of the plurality of arced key dividers includes a plurality of raised guide portions and a plurality of tactile cue portions interposed between the plurality of raised guide portions that provide lateral tactile cues. The plurality of arced key dividers are arranged in a parallel configuration.

Also, a handset device includes a laminated front sub-assembly and a rear housing supporting the laminated front sub-assembly. In addition, in one example, an integrated circuit substrate, a battery, and a speaker are held adjacent to each other in a non-stacked arrangement in the rear housing. In one example, the laminated front sub-assembly may include a sheet having operative indicia coupled therewith and a user interface substrate operatively coupled to the sheet. The laminated front assembly can also include a display, such as an electrophoretic display, held between the user interface substrate and the sheet.

As such, a device is disclosed with a laminated front sub-assembly that provides a front structure while eliminating the need for a traditional front cover. The layout of major components of size, such as the speaker, battery, and integrated circuit substrate, reside adjacent to one another, allowing for a thin construction. Other advantages will be recognized by one of ordinary skill in the art.

Figure 1:
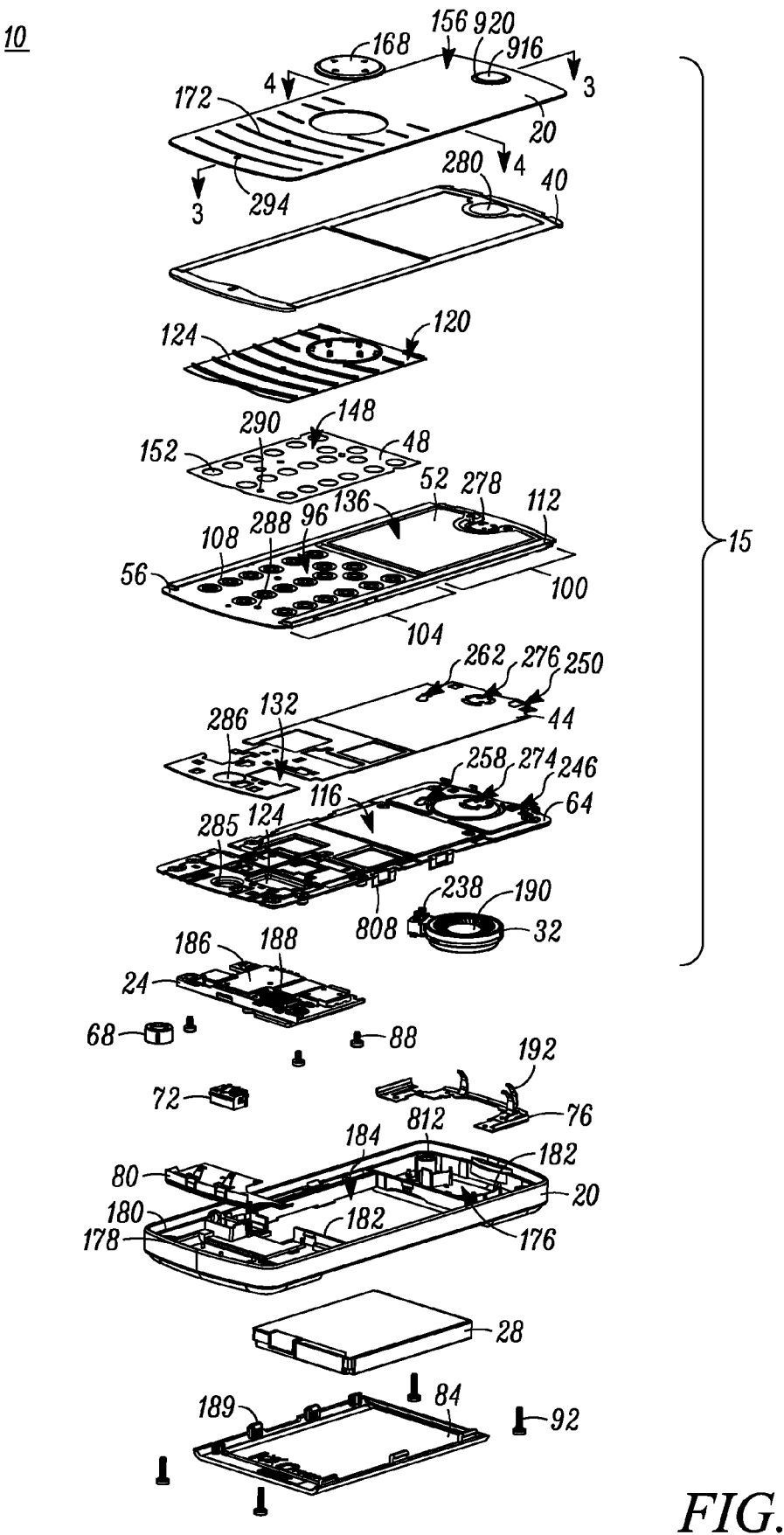
FIG. 1 is an exploded assembly view, shown from the front perspective, of one example of a handset device depicting one embodiment of the invention.
Figure 2:
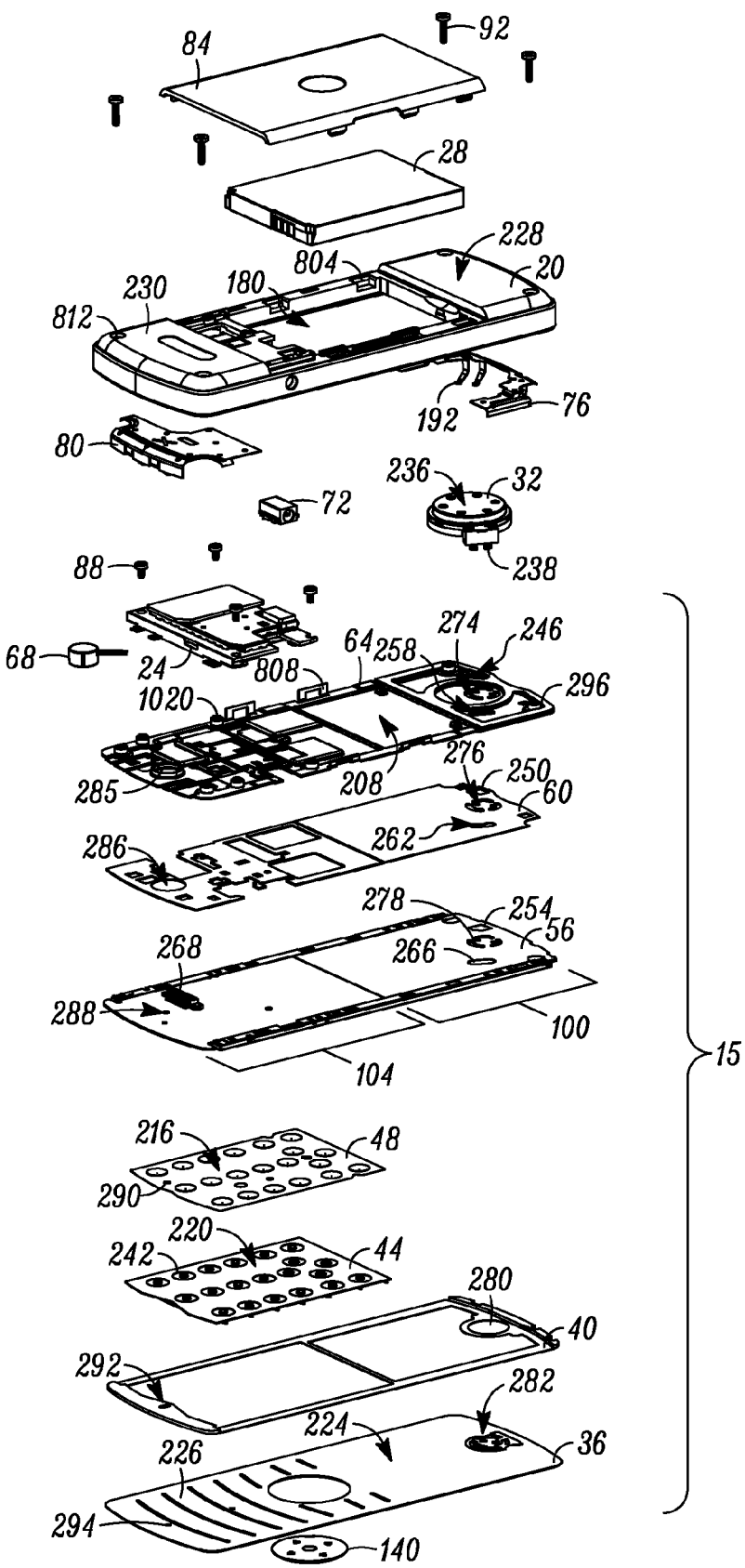
FIG. 2 is an exploded assembly view, shown from the rear perspective, of one example of a handset device depicting one embodiment of the invention.

FIG. 1 is an exploded assembly view, shown from the front perspective, of one example of a handset device 10 depicting one embodiment of the invention. A rear perspective of the same handset device 10 is shown in FIG. 2. The handset device 10 can be embodied as any suitable handset device having any suitable functionality, including but not limited to, a wireless telephone, an internet appliance, a handheld computer, a personal digital assistant, a digital entertainment device, a radio communication device, a tracking device, a personal training device, a global positioning device, or a combination thereof. For purposes of illustration only, a wireless telephone device is exemplified.

The handset device 10 includes a laminated front sub-assembly 15 and a rear housing 20 supporting the laminated front sub-assembly 15 where an integrated circuit substrate 24, a battery 28, and a speaker 32 are held adjacent to each other in a non-stacked arrangement in the rear housing 20. The laminated front sub-assembly 15 includes, in one example, a sheet 36 and a user interface substrate 56. The laminated front assembly 15 may also include an adhesive sheet 40. Adhesive sheet 40 may be a pressure sensitive adhesive and may be in multiple sections. As shown, adhesive sheet 40 is separated into three sections, a small strip at the top, a small strip at the bottom, and a main "A" shaped section through the middle. Different thicknesses of adhesive may be needed in different areas based upon the underlying structure to which they are adhered. The laminated front assembly may also include a keypad substrate 44 (e.g., an elastomeric substrate such as silicone or other suitable material), a keypad contact array 48, a display 52, a user interface substrate 56 that supports the display 52, a user interface substrate adhesive 60, and a metal chassis 64. The handset device 10 may further include a microphone 68, a charging jack 72, a top antenna 76, a bottom antenna 80, a battery cover 84, integrated circuit substrate retaining screws 88, and rear housing retaining screws 92.

The user interface substrate 56 includes a top surface 96 and a bottom surface 204 (see FIG. 2). The user interface substrate 56 further includes an upper part 100 and a lower part 104. The display 52 is operatively coupled to the upper part 100 of the user interface substrate 56. The display 52 is coupled to a display electrode pattern 604 (see FIG. 6, discussed below) that is formed on the top surface 96 of the upper part 100 of the user interface substrate 56. A keypad contact array 108 is formed in the lower part 104 of the user interface substrate 56. The keypad contact array 108 may be a patterned, conductive material such as exposed copper or other electrically conductive material from a layer of the user interface substrate 56, such as a printed circuit board. The user interface substrate 56 may be a printed circuit board (PCB) comprising a resin-based material, such as FR4, or any other suitable material. For example, the user interface substrate 56 may be a PCB with a patterned copper alloy layer on the top surface 96. The user interface substrate 56 may have a patterned, conductive material on both the top surface 96 and the bottom surface 204. Other substrate materials may also be used, such as resin-based composite material, polyester, flexible substrate material, ceramic, or any other suitable substrate material as is known in the art. The patterned conductive material may alternatively include a conductive ink layer. Other materials for the user interface substrate 56 include FR4 Type No. MCL-E-67, manufactured by Hitachi Chemical Co. or Pyralux® manufactured by DuPont. Other materials for the keypad contact array 48 include ESP-10 Tactile Sheets manufactured by Panasonic or SK5AB Series Contact Sheets manufactured by Alps Electric, Inc.

The user interface substrate 56 may further include informational lighting for a keypad and display 52. For example, two LED's (not shown) may be operatively coupled to ends of light guides 507 (see FIG. 5) on the user interface substrate 56. Two narrow light guides 507 may be placed along the right and left sides of the top surface of the user interface substrate 56 and retained by stamped metal brackets 112 that wrap around the edges of the user interface substrate 56. The light guides 507 are aligned to the LED's in order to carry light the full length of the handset device 10 and to distribute that light into the keypad and on top of the display 52. The metal brackets 112 may also serve as light reflectors.

The metal chassis 64 includes a top surface 116 and a bottom surface 208 (see FIG. 2). The metal chassis 64 may be a stamped metal sheet such as stainless steel or any suitable material, such as aluminum, copper, steel, or alloys thereof, and may be machined by any other process, such as casting, forging, drilling, cutting, or molding, as is known in the art.

During assembly of the laminated front sub-assembly 15, the user interface substrate 56 is operatively coupled to the metal chassis 64. For example, the bottom surface 204 of the user interface substrate 56 may be adhered to the top surface 116 of the metal chassis 64 via the user interface substrate adhesive 60. The user interface substrate adhesive 60 may be a sheet of adhesive or a composite film having two-sided adhesive, such as 9495 MP manufactured by 3M. The user interface substrate adhesive 60 may be any type of adhesive, as known in the art, such pressure-sensitive adhesive, heat cured adhesive, or ultraviolet cured adhesive. Alternatively, the user interface substrate 56 may be assembled to the metal chassis 64 using a combination of physical interlocks, such as screws, formed hooks, snap catches, soldering or welding, either in place of or combined with the user interface substrate adhesive 60.

The metal chassis 64 may provide structural strength and rigidity to the laminated front sub-assembly 10. The metal chassis 64 also provides features to facilitate ease of assembly and disassembly of the handset device and for shielding structure between components in the rear housing, such as the top and bottom antennas 76 and 80, and the front of the handset device 10. However, as an alternative, the metal chassis 64 may be eliminated. For example, a metal layer, such as an inner copper layer in a multiple level PCB, may be added to the user interface substrate 56, to function as a grounding plane/shield and to strengthen the user interface substrate 56. In addition, mechanical coupling features, such as slots, tabs, and screw bosses, may be formed, molded, cut, or embedded in the user interface substrate 56 so that the user interface substrate 56 may be operative to movably retain screws, tabs, slots, or other features of the rear housing 20.

Figure 6:
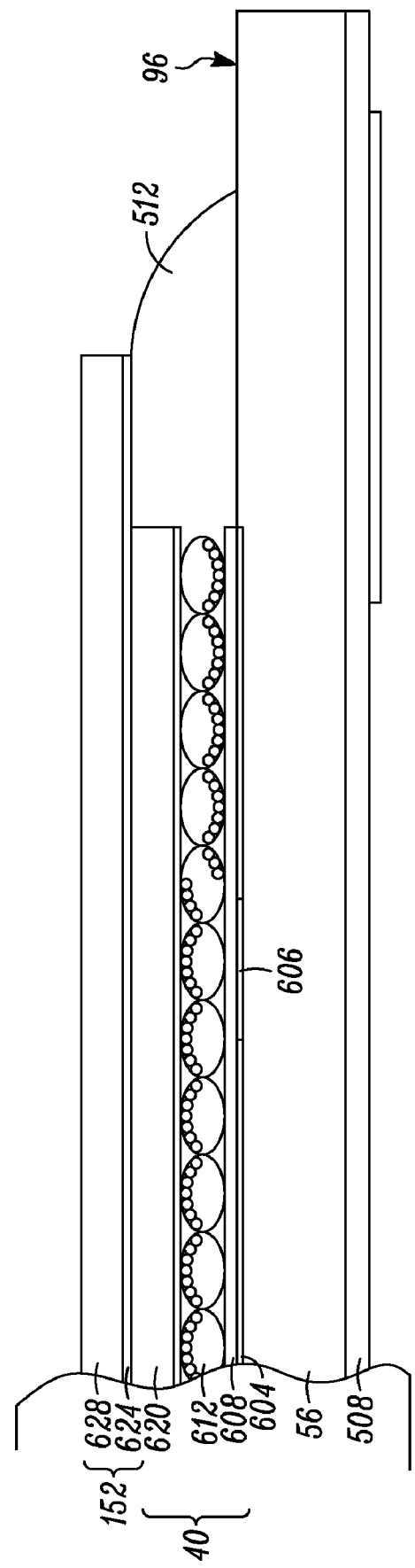
FIG. 6 is a schematic diagram of part of a laminated front sub-assembly of one example of a handset device depicting one embodiment of the invention.

The display 52 is operatively coupled to the top surface 96 of the user interface substrate 56, such as by a conductive lamination adhesive (see FIG. 6) or other suitable attachment technique. The display 52 has a top surface 136 and a bottom surface 702 (see FIG. 7). The display 52, as a sub-assembly, may be coupled to the user interface substrate 56 by, for example, adhering the back of the display 52 to the user interface substrate 56 using the lamination adhesive. In another embodiment, a conductive adhesive may be used to bond the bottom surface 702 of the display 52 to the display electrode pattern 604 of the user interface substrate 56. Layers of the display 52 may be laminated onto the user interface substrate 56. For example, where the display 52 is an electrophoretic display, the layers of the electrophoretic display (EPD) may be sequentially laminated directly to the user interface substrate 56 as shown in FIG. 6 and as described below. In the case of an EPD display, or similar laminar display, the display electrode pattern 604 (see FIGS. 6 and 7) on the top surface of the user interface substrate 56 may be used as a backplane electrode to control the display 52.

The keypad contact array 48 is secured to the top surface 96 of the user interface substrate 56. The keypad contact array 48 has a top surface 148 and a bottom surface 216 and may further include topological features such as depressible domes as known in the art. The keypad contact array 48 may include, for example, an array of metal domes 152 held in flexible carrier sheet as is known in the art. For example, the keypad may include stainless steel domes 152 in a plastic carrier sheet. The domes 152 need not be metal but may include other conductive materials, or combinations of materials, such as carbon or graphite. The keypad contact array 48 may be adhered to the top surface 96 of the user interface substrate 36. The plastic carrier sheet is laminated to the PCB throughout the entire back surface 216, aside from where the metal domes actually reside. Typically this is accomplished via a screen printed pressure sensitive adhesive that has been applied to the back surface 216 of the plastic carrier film. Typically, this adhesive is also used to actually hold the metal domes in place on the plastic carrier sheet. The array of domes 152 is thereby suspended over the keypad contact array 108 of the user interface substrate 56. When a contact dome in the array 48 is depressed, an electrical connection is made between the conductive material of the dome and the conductive material of the keypad contact array 108.

Figure 12:
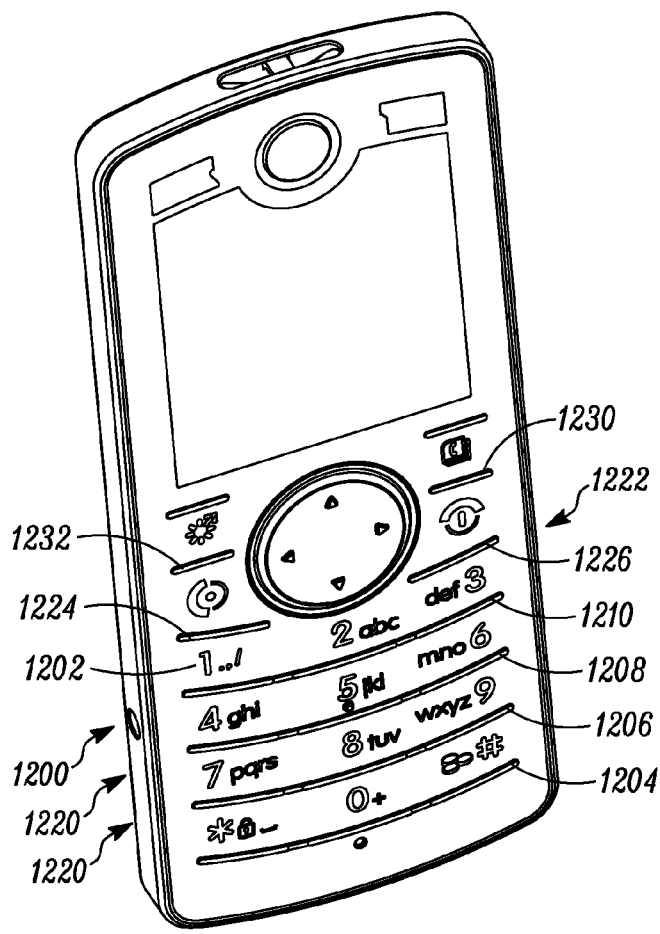
FIG. 12 is a perspective view of a portion of a handset device shown in FIG. 1 in accordance with one embodiment of the invention.

The keypad substrate 44 may be used to provide tactile cues for a user of the keypad 1200 (see FIG. 12). The keypad substrate 44, which may be of a silicone material or other suitable material, may be secured either to the keypad dome array 48 or to the user interface substrate 56. However, preferably, the top surface 120 of keypad silicone substrate 44 is attached to the back surface 224 of sheet 36. The keypad substrate 44 includes a top surface 120 and a bottom surface 220 (see FIG. 2). The top surface 120 of the keypad substrate 44 may include suitably shaped key dividers. In this example they are shown as arced key dividers extending outwardly from the top surface 120 of keypad silicone substrate 44. These arced key dividers may extend through arced slots 172 in the sheet 36 in the assembled handset device 10 to provide improved tactile feedback for the user of the handset device 10.

The sheet 36 is secured to the user interface substrate 56 via adhesive sheet 40 to form the laminated front sub-assembly 15. In addition the sheet can be adhered to brackets 112. However, a non-adhesive sheet can be used or any suitable coupling mechanisms. The sheet 36 has a top surface 156 and a bottom surface 224 (see FIG. 2). The sheet 36 has an upper part 160 and a lower part 164. The sheet 36 is planar and has no upwardly or downwardly extending side walls. The sheet 36 may be secured to the user interface substrate 56. For example, the perimeter of the bottom surface 224 of the sheet 36 may be adhered to the top surface 96 of the user interface substrate 56 through the adhesive sheet 40. For example, the adhesive sheet 40 bonds to upper and lower edges of the user interface substrate 56, to the right and left edges of the light guide brackets 112, and to the complete perimeter of the display 52. As a result, a complete perimeter of adhesive sheet 40 may be assembled to prevent dust from entering the handset device 10, in general, and the display viewing area, in particular. The adhesive sheet 40 may be a sheet of adhesive or a composite film having two-sided adhesive. The adhesive sheet 40 may be any type of adhesive, as known in the art, such as pressure-sensitive adhesive, heat cured adhesive, or ultraviolet cured adhesive. For example, the adhesive sheet 40 may be a material such as 9495 MP manufactured by 3M.

The sheet 36 provides a rugged surface capable of withstanding direct contact with the user and exposure to the environment. The sheet 36 may be a hard coated transparent material, such as poly carbonate, acrylic, or polyethylene terephthalate. Other material such as Tupilon NF2000, manufactured by Mitsubishi Engineering-Plastics Corporation and HP92S, manufactured by GE Plastics may also be used if desired. The sheet 36 may serve as an exterior surface for user interaction with the keypad 32 and as a transparent protective cover for the display 52.

To facilitate operator use of the handset device 10, the sheet 36 may include operative indicia 226 (see FIG. 2 as discussed below), such as alphanumerical graphics or other graphics to facilitate operation of the device 10. The sheet 36 may include a navigation key 168, useful, for example, to navigate menus on the handset device 10. The navigation key 168 may be molded into the sheet 36 or may be mechanically coupled to the laminated front sub-assembly 15.

The sheet 36 serves as a protective lens for the display 52. In addition, the combination of the sheet 36 and the adhesive sheet 40 seals out dust and other contaminates from the display 52. The sheet 36 may be sized to fit over the display 52 or the keypad or both the display 52 and keypad. The sheet 36 may be sized to fit inside the rear housing 20. The sheet 36 may be sized to extend over the exterior side walls 304 (see FIG. 3) of the rear housing 20.

It will be recognized by one skilled in the art that a top sheeting, not shown, such as an anti-scratch film or a protective shipping film, may be placed on top of the sheet 36 within the scope of the invention.

The rear housing 20 is assembled to support the laminated front sub-assembly 15. The rear housing 20 includes a base wall 230 (see FIG. 2) having a top surface 176 and a bottom surface 228 (see FIG. 2), external side walls 178 extending upward, and a ridge 180 (see also FIG. 5) on external side walls adapted to receive the sheet 36 of the laminated front sub-assembly 15. The rear housing 20 further includes internal side walls 182 adapted to support the metal chassis 64 of the laminated front sub-assembly 15 or to support other components held in the rear housing 20, such as the integrated circuit substrate 24, the speaker 32, the top and bottom antennas 76 and 80, and the charging jack 72. The internal side walls 182 are also adapted to form a battery compartment 184 within the rear housing 20 yet without a base wall 230 underlying the battery 28 such that the battery 28 can be serviced without disassembly of the rear housing 20 from the laminated front sub-assembly 15. The rear housing 20 may be a resin-based material that is molded using techniques well known in the art of injection molding. The rear housing material may be a single material or a composite material. For example, the rear housing 20 may include Lexan EXL1414, manufactured by GE Plastics and Bayblend T85, manufactured by Bayer.

The rear housing 20 is adapted to receive relatively large components, such as the integrated circuit substrate 24, the battery 28, and the speaker 32, such that these components may be held adjacent to each other in the rear housing 20 in a non-stacked configuration in the rear housing 20. That is, no member of the group of the integrated circuit substrate 68, the battery 100, and the speaker 32 is stacked on any part of another member. The battery 28 is retained in the rear housing 20 between the speaker 32 and the integrated circuit substrate 24. These components occupy a relatively large amount of the volume of the rear housing 20. In addition, due to the thin profile achieved by the laminated front sub-assembly 15, thicknesses of the integrated circuit substrate 24, the battery 28, and the speaker 32, once assembled, may determine the relative height of the assembled handset device 10. By distributing the integrated circuit substrate 24, the battery 28, and the speaker 32 over the length of the rear housing 20 in an adjacent and non-stacked arrangement, the thickness of the assembled handset device 10 is minimized.

The integrated circuit substrate 24 is assembled to the metal chassis 64 via screws 88. Alternatively, it could be held in rear housing 20 via screws, or snap catches, or similar mechanism. The integrated circuit substrate 24 is further operatively coupled to the laminated front sub-assembly 15 by screws to metal chassis as described above. The integrated circuit substrate 24 has a top surface 186 and a bottom surface 232 (see FIG. 2) and is adapted to carry a plurality of integrated circuit packages, dies or other electronic devices. The integrated circuit substrate 24 may be a printed circuit board (PCB) comprising a resin-based material, such as FR4, with a patterned, conductive material thereon or any suitable material. For example, the integrated circuit substrate 24 may be a PCB with a patterned copper layer on the top surface 186. The integrated circuit substrate 24 may have a patterned, conductive material on both the top surface 186 and the bottom surface 232 and may be a multiplayer printed circuit board such as those provided by WUS and Unimicron Technology Corp or any other suitable manufacturer. Other substrates materials may be used, such as resin-based composite material, flexible substrate material, or ceramic, as is known in the art. The integrated circuit substrate 24 may carry and interconnect a primary transceiver chip set, or engine, for the handset device 10. The integrated circuit substrate 24 may carry any or a combination of electronic devices, including central processing units, memory, modulators, and demodulators as known in the art. The integrated circuit substrate 24 may be electrically coupled to the user interface substrate 56 via connector 188 on the top surface 186 of the integrated circuit substrate 24. The integrated circuit substrate 24 may be mechanically coupled to the metal chassis 64 using screws 88 retained threaded in bosses 1020 (see FIG. 10) on the metal chassis 64. The metal bosses 1020 may also serve to connect electrical ground between the integrated circuit substrate 24 and the metal chassis 64, thereby grounding the metal chassis 64 for purposes of shielding the substrate 56 from unwanted electrical radiation, enhancing the antenna radiation pattern, and providing an electrical path for electrostatic discharges. The bosses 1020 may be press fit with the metal chassis or may be integral with the chassis. The integrated circuit substrate 24 may be accessible for repair or replacement by removing the rear housing 20 and battery 28.

The battery 28 is held in the rear housing 20 in the battery compartment. The battery 28 is further coupled to the integrated circuit substrate 24 through spring contacts as known in the art. The battery 28 may be any electrical storage cell as is known in the art. The battery 28 may be rechargeable. The battery cover 84 may be mechanically coupled to the rear housing 20 by catch features 189 on the battery cover 84. The battery 28 may be easily removed by removing the battery cover 84.

The speaker 32 is held in the rear housing 20. The speaker 32 is further coupled to the integrated circuit substrate 24 using electrical connectors 238 that pass through metal chassis 64 and user interface adhesive 60 and connect with conductive pads on the bottom of the user interface substrate 56. The conductive pads are coupled to electrically conductive traces that are connected with the integrated circuit substrate through connectors 268 and 188. The audio output side 190 of the speaker 32 is disposed toward the front of the handset device 10 while the back side 236 (see FIG. 2) of the speaker 32 is held by the rear housing 20. The speaker 32 may be of any type known in the art such as solid state speaker, a ceramic speaker, or a wound coil speaker. The speaker 32 may be used, for example, to provide low volume phone audio, loud speaker audio, ring tone audio, or vibration. The speaker 32 may further include electrical connectors 238 (see FIG. 2), such as spring connectors.

Top antenna 76 and bottom antenna 80 may be held in the rear housing 20. The top antenna 76 may be further coupled to the integrated circuit substrate 24 through the user interface substrate 56 in a similar manner as the speaker. The coupling to the antennas on the user interface substrate 56 may take the form of controlled impedance transmission lines, achieved by employing coplanar waveguide transmission lines having impedance largely defined by the spacing between conductor traces on a single layer, which are suitable for low cost assemblies, or by multilayer transmission line structures such striplines or microstrip-lines. The bottom antenna may be coupled in a similar manner as the speaker and top antenna if desired or in any other suitable manner. For example, the bottom antenna 80 can be directly coupled to electrical contacts on bottom of the integrated circuit substrate 24, or other surface thereof. The two antenna elements 76 and 80 may be attached to the rear housing 20 on the bottom surface 176 of the housing 20. Alternatively, a single antenna may be used. The antennas 76 and 80 may include integral connectors 192 for operatively coupling the antennas 76 and 80 to the laminated front sub-assembly 15. The connectors 192 may be in the form of spring connectors wherein the stamped metal is shaped to bend under loading. In the assembled handset device 10, the connectors 192 pass through electrical ports 246 (see FIG. 2) in the metal chassis 64 to contact the user interface substrate 56. Force exerted on the connectors 192 from the rear housing 20 hold the connectors 192 in place while the bending, or spring action, of the spring connector insures electrical connectivity without the need for soldering. Dual planar antennas are shown as top and bottom antennas 76 and 80 and are of stamped metal although other antenna types, as known in the art, may be used. Dual planar antennas may be useful in a handset device 10 with a full length shield as defined by the metal chassis 64.

A microphone 68 may be held in the rear housing 20 in any suitable manner. The microphone 68 may be coupled to the integrated circuit substrate 24. For example, the microphone 68 may be electrically coupled to the integrated circuit substrate 24 by, for example, soldering lead wires from the microphone 68 directly to the integrated circuit substrate 24. The microphone 68 may be held in the rear housing 20 by internal side walls 182 in the rear housing 20 adapted to support the microphone 68. Internal side walls 182 in the rear housing 20 may further support the microphone 68 against the user interface substrate adhesive layer 60 secured to the user interface substrate 56. A charging jack connector 72 is also held in the rear housing 20 and may be secured to the integrated circuit substrate 68. The microphone is held in primarily by press fit of the surrounding microphone grommet into a formed feature in the metal chassis 64, as depicted by feature 285. Features in housing 20 apply pressure to the back of microphone to seal it against back surface 204 of substrate 56.

FIG. 2 is an exploded assembly view, shown from the rear perspective, of one example of a handset device depicting one embodiment of the invention. Further to the embodiments described above, the rear perspective view of the handset device 10 better illustrates certain aspects.

Operative indicia 226 may be applied to the sheet 36. For example, decorative ink may be applied to the bottom surface 224 of the sheet 36 to provide color and decoration to the front of the handset and to provide operative indicia 226, such as graphics, to aid operation of the handset device 10. An opening in the decorative ink provides a viewing window for the display 52. Alternatively, decals, appliqués, or other graphic films, paints, or coatings may be used as known in the art.

The bottom surface 220 of the keypad silicone substrate 44 may include extensions 242, or plungers, that actuate the domes 152 of the keypad dome array 48 when a user exerts force on the keypad silicone substrate 44.

To facilitate passage of electrical signals between components or layers without cabling or soldering, electrical ports may be defined in structures within the handset device 10. For example, the metal chassis 64 may define electrical port 246 for passing through the connector 192 of the upper antenna 76. Similarly, the user interface substrate adhesive 60 may define electrical port 250 that, upon assembly of the metal chassis 64 with the user interface substrate adhesive 60, extends the antenna electrical port to the user interface substrate 56. Electrical contact pad 254 may be included on the bottom surface 204 of the user interface substrate 56 as a conductive path and accepts the antenna connector 192. The antenna connector 192 is held against the contact pad 254 by mechanical force applied by the rear housing 20 contacting the antenna 76 when the handset device 10 is assembled.

Similarly, the metal chassis 64 may define electrical port 258 for passing through the connector 238 of the speaker 32. The user interface substrate adhesive 60 may define electrical port 262 that, upon assembly of the metal chassis 64 with the user interface substrate adhesive 60, extends the speaker electrical port to the user interface substrate 56. Contact pad 266 may be included on the bottom surface 204 of the user interface substrate 56 as a conductive pad to accept the speaker connector 238. The speaker connector 238 is held against the contact pad 266 by mechanical force applied by the rear housing 20 contacting the bottom side 236 of the speaker 32 when the handset device 10 is assembled.

A connector 268 for the integrated circuit substrate 24 may be secured to the bottom surface 204 of the user interface device 56. An electrical port 272 for passing the connector 268 may be defined in the metal chassis 64. After the metal chassis 64 and the user interface substrate 56 are assembled, the electrical connector 188 of the integrated circuit substrate 24 may be plugged into the user interface device connector 268 to operatively connect the substrates.

Electrical components 1002 (see FIG. 10), including drivers for the display 52, may be secured to lower part 104 of the bottom surface 204 of the user interface substrate 56. However, the upper part 100 of the bottom surface 204 of the user interface substrate 56 (the side opposite from the display 52) may be kept free from components in order to facilitate lamination of an electrophoretic display film 52.

Figure 3:
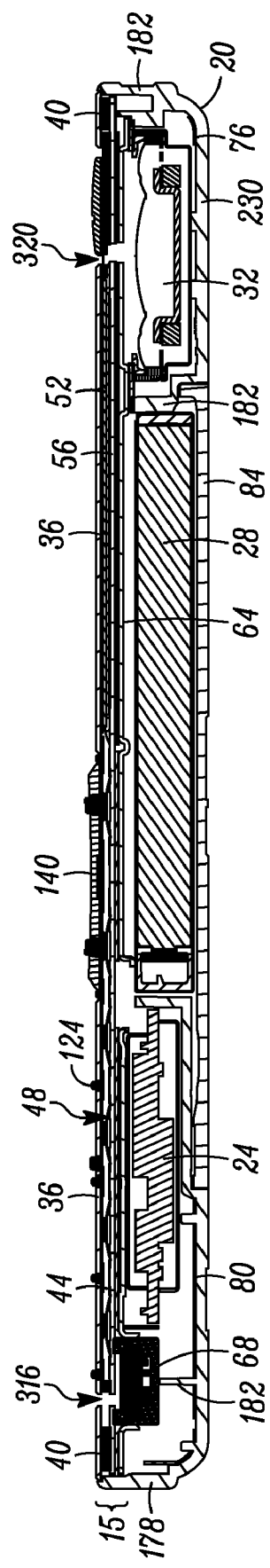
FIG. 3 is a lengthwise cross section of an assembled version of the handset device of FIG. 1 taken along the lines 3-3 depicting one embodiment of the invention.
Figure 11:
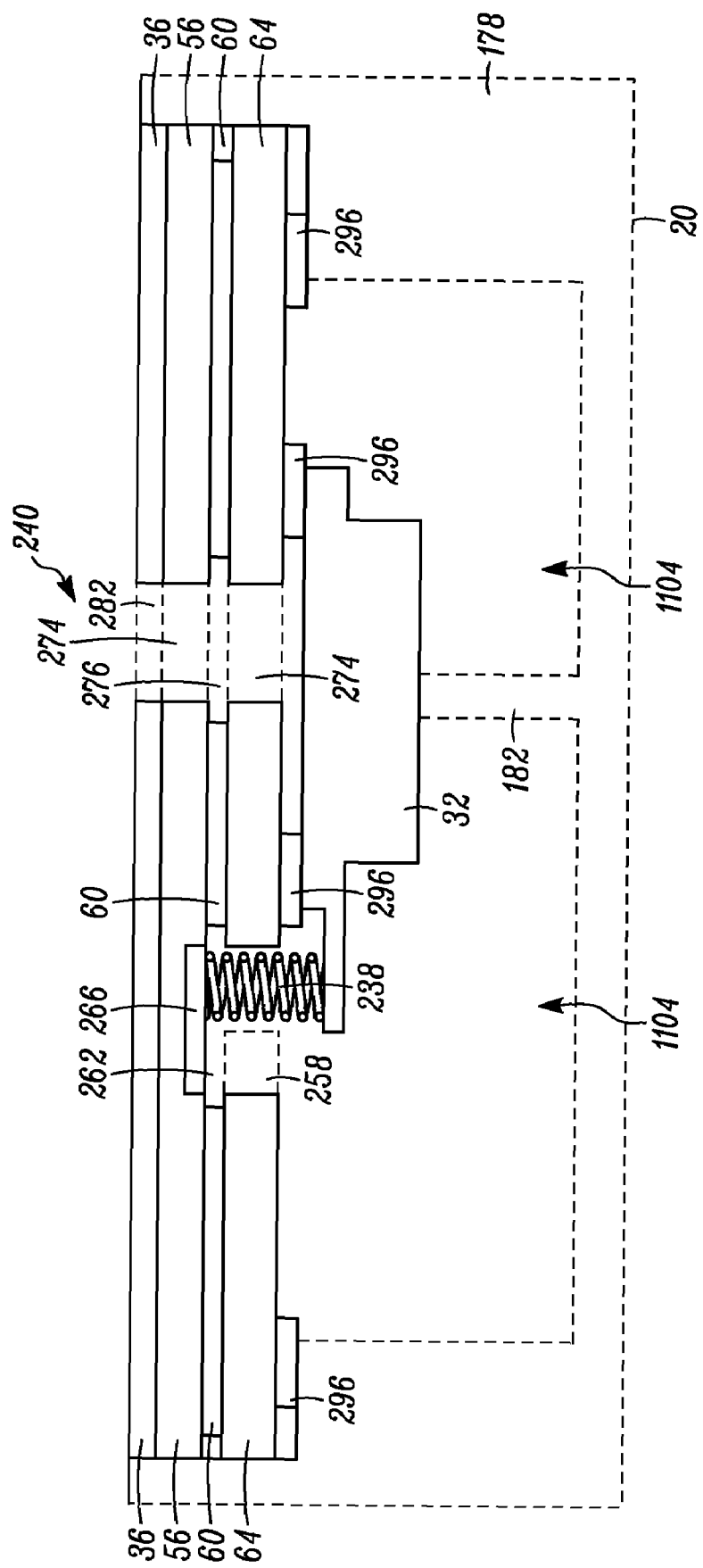
FIG. 11 is a widthwise cross section of the speaker cavity of an assembled version of the handset device of FIG. 8 taken along lines 11-11 depicting one embodiment of the invention.

Referring also to FIG. 3 and FIG. 11, to facilitate passage of sound between the speaker 32 and outside the handset device 10 and between the outside of the handset device 10 and the microphone 68, microphone audio port 316 and speaker audio port 320 may be defined by stacked openings in layers of the laminated front sub-assembly 15, the adhesive sheet 40 and metal chassis (if they are used). For example, for the speaker 32, audio port portion 274 is defined by the metal chassis 64, audio port portion 276 is defined by the user interface substrate adhesive 60, audio port portion 278 is defined by the user interface substrate 56, audio port portion 280 is defined by the adhesive sheet 40 and audio port portion 282 is defined by the sheet 36. It will be recognized that FIG. 11. does not show detail of all the layers above the speaker for ease of description purposes. For example it does not show display 52 nor adhesive sheet 40 that form portions of the ports. The assembly of the handset device 10 creates a continuous audio port through the handset device between the audio output side 190 of the speaker 32 and the top surface 156 of the sheet 36 by vertically stacking sections of audio port portions defined in each layer. In similar fashion, for the microphone 68, audio port portion 285 is defined by the metal chassis 64, audio port portion 286 is defined by the user interface substrate adhesive 60, audio port portion 288 is defined by the user interface substrate 56, audio port portion 292 is defined by the adhesive sheet 40, and audio port portion 294 is defined by the sheet 36. The assembly of the handset device 10 creates a continuous microphone audio port through the handset device between the microphone 68 and the top surface 156 of the sheet 36. The microphone 68 is surrounded by a rubber grommet, as shown in FIG. 3. The grommet seals circumferentially to the body of the microphone via interference fit, and also seals circumferentially to the metal chassis 64 via interference fit in formed feature 285, and seals via pressure to back side 204 of substrate 56, the pressure being applied by a rib wall 182 in rear housing 20.

A gasket 296 seals the audio output side 190 of the speaker 32 to prevent audio leakage or echo between the speaker 32 and microphone 68 in the handset device 10, and sealing an audio cavity at the interface of the chassis 64 to the housing 20. When the handset device 10 is assembled, the internal side walls 182 in the rear housing 20 mechanically support the speaker 32 against the gasket 296. The audio port 282 is sealed against leakage by the adhesive layers 60 and 40 around the entire perimeter of the metal chassis 64, the user interface substrate 56, and the sheet 36 in the porting holes.

FIG. 3 is a lengthwise cross section of an assembled version of the handset device of FIG. 1 depicting one embodiment of the invention. The cross section shows a thin, laminated front sub-assembly 15 including a laminate of the metal chassis 64, the user interface substrate adhesive 60, and the user interface substrate 56 onto which the keypad and the keypad silicone substrate 44 are laminated in a lower part 304 of the handset device 10 and onto which the display 52 is laminated in an upper part 308 of the handset device 10. The adhesive sheet 40 and the sheet 36 are laminated across lower part 304 and upper part 308 to complete the laminated front sub-assembly 15. Among other advantages, the laminated front sub-assembly 15 provides user interface functions of display and keypad entry while sealing and protecting the contents of the handset and while exhibiting a very thin profile.

The cross section shows the rear housing 20 supporting the laminated front sub-assembly. In particular, external side walls 178 support the sheet 36, while internal side walls 182 support other layers of the laminated front sub-assembly such as the metal chassis 64 and the user interface substrate 56. The rear housing 20 holds large components such as the integrated circuit substrate 24, battery 28, and speaker 32. Internal side walls 182 support the speaker 32 and the integrated circuit substrate 24. Internal side walls 182 define the battery compartment 184 (see FIG. 1) while supporting the battery 28, indirectly, by coupling to the battery cover 84. In addition, the microphone 68 is supported by internal side walls 182. The top antenna 76 and the bottom antenna 80 are supported by the base wall 230 of the rear housing 20.

The integrated circuit substrate 24, battery 28, and speaker 32 are held adjacent along the length of the handset device 10 while not stacking. This arrangement minimizes the thickness of the handset device 10. The top antenna 76 and the bottom antenna 80 are held along the bottom of the handset device 10 while the metal chassis 64 is positioned between the antennas 76 and 80 and the sheet 36 of the handset device 10. Speaker audio port 320 and microphone audio port 316 are defined by ports in several layers of the laminated front sub-assembly 15 as described above.

Figure 4:
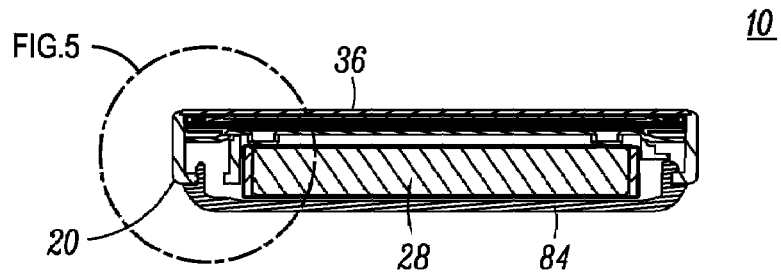
FIG. 4 is a widthwise cross section of an assembled version of the handset device of FIG. 1 taken along lines 4-4 depicting one embodiment of the invention.
Figure 5:
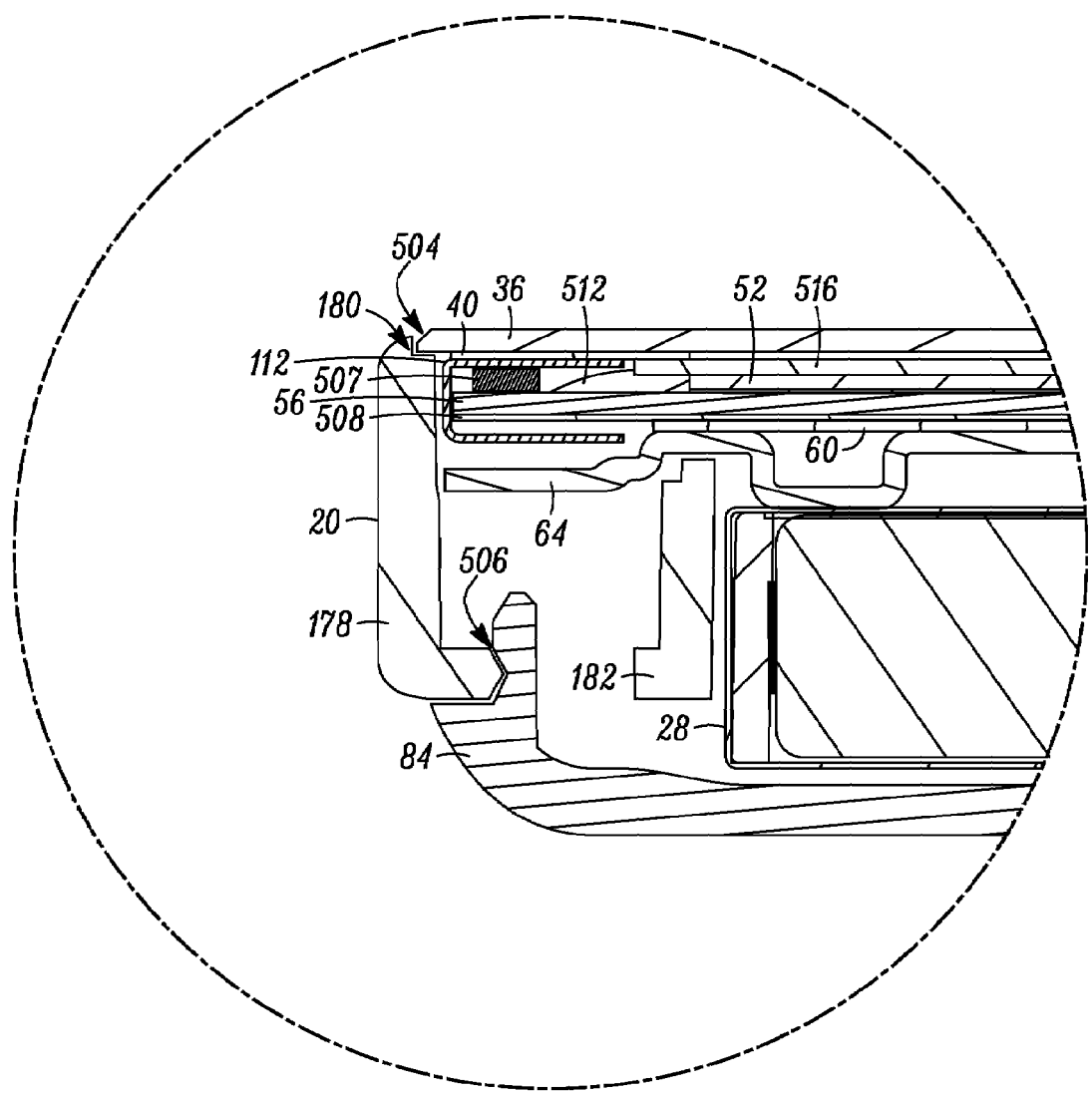
FIG. 5 is an enlarged view of part of the cross section shown in FIG. 4 depicting one embodiment of the invention.

FIG. 4 is a widthwise cross section of an assembled version of the handset device of FIG. 1 depicting one embodiment of the invention. FIG. 5 is an enlarged view of part of the cross section shown in FIG. 4 depicting one embodiment of the invention. The interface between the sheet 36 and the rear housing 20 is shown in detail. In this example, a supporting surface is located along sidewalls of the rear housing to support the sheet 36. In this example, the ridge 180 is formed in the exterior side wall 178 of the rear housing 20 to receive the sheet 36 such that sheet 36 partly extends over the exterior side wall 178 of the rear housing 20 while fitting inside the rear housing 20. Alternatively, the rear housing 20 may simply present a flat surface, without notching, such that, if the sheet 36 is sized to extend on top of the exterior side wall 178, then the sheet 36 will not fit inside the rear housing 20. Alternatively, the sheet 36 may be sized to fit inside the rear housing 20 without extending over the exterior side wall 178. In addition, the edge 504 of the sheet 36 is chamfered to provide a smooth interface edge. It will be appreciated by one skilled in the art that other embodiments of the interface between the sheet 36 and the rear housing 20 are possible within the scope of the invention.

The battery cover 84 mechanically couples to the rear housing 20 such that the rear housing 20 supports the battery 28 via the battery cover 84. While a latch arrangement 506 between the rear housing 20 and the battery cover 84 is depicted, it will be appreciated by one skilled in the art that other embodiments of the interface between the rear housing 20 and the battery cover 84 are possible within the scope of the invention. In the example shown, the door hooks along one side via the hooks shown on the far right side of FIG. 4. There are three of these hooks and can be seen at the very bottom of FIG. 1, (not labeled). The door is rotated down and two plastic catch features 189 shown in FIG. 1 engage with a stamped metal leaf spring latch (not shown) that is assembled to housing 20. Feature 506 is a light detent to assist the latch and keep that edge of the cover flat. Rather than hooking on one side and latching on the other side, it will be recognized that the door could hook on the bottom edge and latch at the top edge, or vice-versa or that any suitable door configuration may be used.

A light guide 507 is secured to the user interface substrate 56 by the light guide bracket 112. Several additional features of the display 52 are illustrated. A back barrier film 508 is disposed between the user interface substrate 56 and the user interface substrate adhesive layer 60. The back barrier film 508 prevents moisture from entering the display 52 from the back side of the user interface substrate 56. A suitable dispensed sealant 512 is applied to the user interface substrate 56 along the edge of the display 52. The dispensed sealant 512 prevents moisture entry into the display 52. A front barrier film 516 is disposed over the display to prevent moisture entry into the display 52.

FIG. 6 is a schematic diagram of part of a laminated front sub-assembly of one example of a handset device depicting one embodiment of the display 52 that includes by way of example an electrophoretic display of a type such as an E Ink (trademark) imaging film based display produced by E Ink Corporation, Cambridge Mass., USA. An example of a lamination of the user interface substrate 56 and the display 52 is depicted along with additional adhesive and sealing or barrier layers as described below. In this example, the display 52, includes a conductive lamination adhesive 608, an electrophoretic ink 612, an indium tin oxide coating 616, and a front electrode sheet 620. The display 52 is laminated onto a display electrode pattern 604 (see FIG. 7), or back electrode pattern, residing on the user interface substrate 56. The display electrode pattern 604 may include, for example, a metal layer that is selectively etched. The selective etching leaves a display electrode pattern 604 and interposed spaces 606 where the metal layer is removed from the underlying user interface substrate 56.

The ITO coating 616 of the display 52 may be connected to pads, not shown, on the display electrode pattern 604 on the user interface substrate 56 through a conductive epoxy. As known in the art, microcapsules in the electrophoretic ink 612 contain positively and negatively charged white and black particles. Generally, when an appropriate voltage is applied between the display 52 and the ITO coating 616 on display film 620 and the display (back) electrode pattern 604, the white particles will be attracted to one electrode, and the black particles will be attracted to the other electrode. The attractive force will move the particles to thereby cause parts of the display 52 to appear either black or white. A front barrier film 516 which may include an ultraviolet filter is disposed over the display to prevent moisture entry into the display 52.

Alternatively, thin film transistors may be used as the display electrode pattern (back electrode) as is the case for an active matrix electrophoretic display. As described above, a back barrier sheet 508, front barrier film 516, further including a front barrier sheet 628 and an optically clear adhesive 624, and a dispensed sealant 512 may be disposed to prevent moisture penetration into the display 52.

Figure 7:
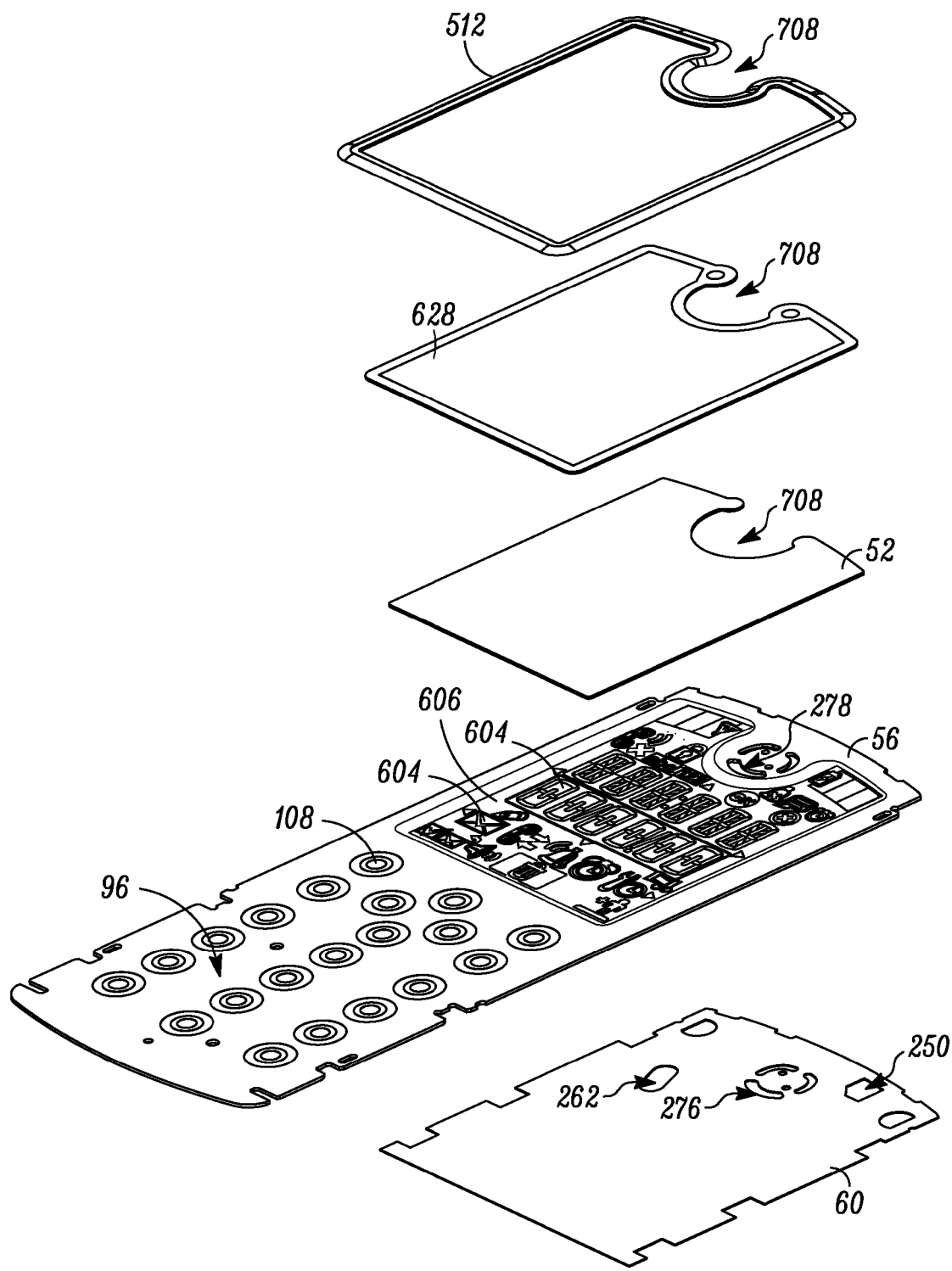
FIG. 7 is an exploded assembly view, shown from the front perspective, of part of the handset device of FIG. 1 depicting one embodiment of the invention.

FIG. 7 is an exploded assembly view, shown from the front perspective, of part of the handset device of FIG. 1 depicting one embodiment of the invention. The top surface 96 of the user interface substrate 56 includes the display electrode pattern 604. The display electrode pattern 604 defines shapes, numbers, and pictures that will appear on the display 52 when appropriate voltage is applied across the display 52 and the display electrode 616 and electrodes pattern 604 (the front and back electrodes). The "background" of the display is, itself, an active electrode, so it can be driven to white or black. The keypad contact array 108 is shown in greater detail. The speaker audio port 276 is defined by the back barrier film 508. Also, there are labels 628 and 624 in FIG. 7. The speaker audio port 278 is defined by the user interface substrate 56. The display 52 is assembled to the user interface substrate 56. The front barrier film 516 is assembled to the display 52. The dispensed sealant 512 is disposed around the perimeter of the display 52. A cutout 708 in the layers of the display is adapted to at least partially surround the area of the user interface substrate audio port 278. While a radius cutout 708 is depicted, it will be recognized by those skilled in the art that various cutout shapes may be used, including shapes that completely surrounding the audio port 278. Lamination of an electrophoretic display 52 to a display electrode pattern 604 makes this design feature possible.

Figure 8:
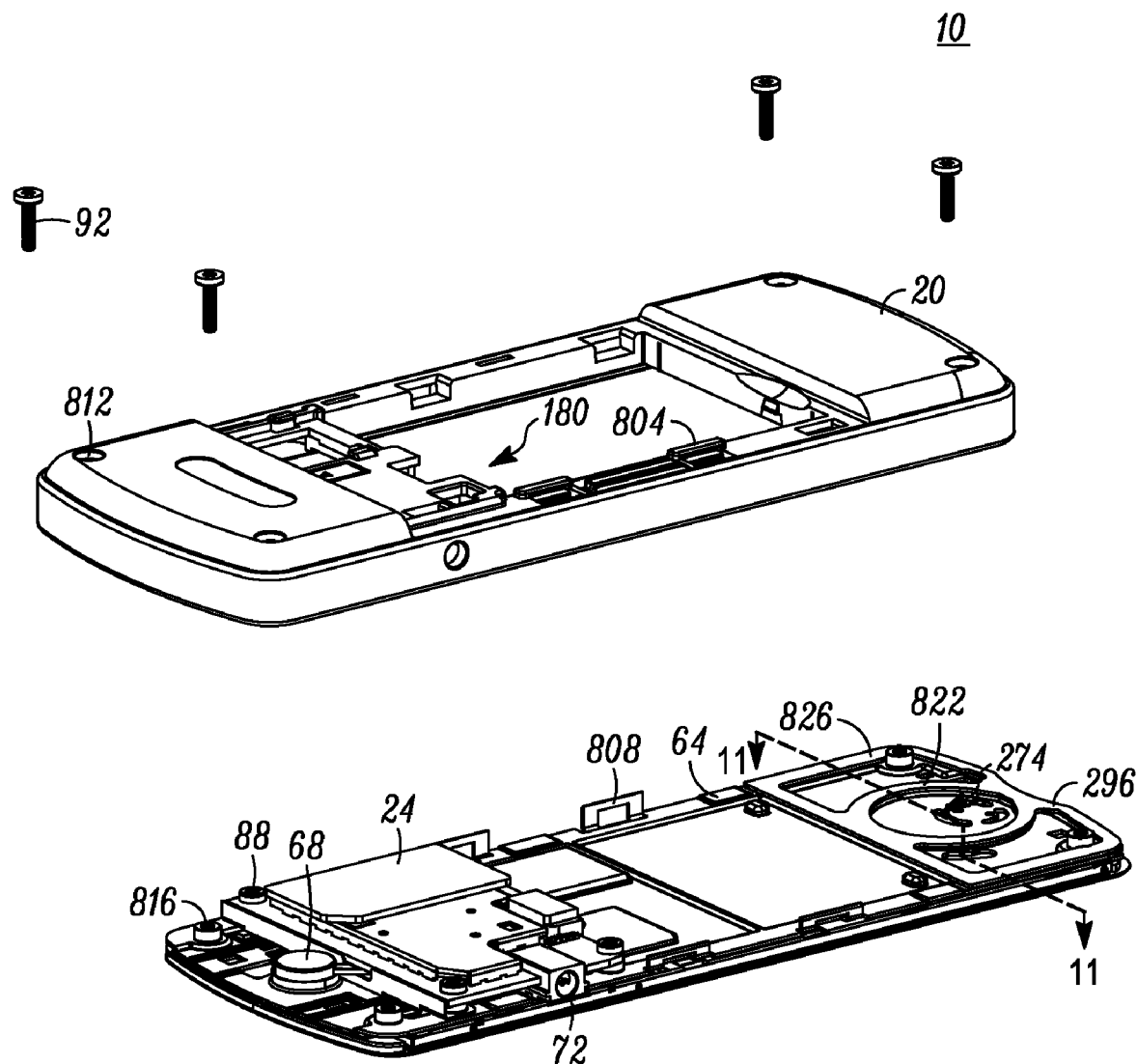
FIG. 8 is an exploded assembly view, shown from the rear perspective, of the handset device of FIG. 2 depicting one embodiment of the invention.

FIG. 8 is an exploded assembly view, shown from the rear perspective, of the handset device of FIG. 2 depicting one embodiment of the invention. The bottom surface 228 of the rear housing 20 and the bottom surface 208 of the metal chassis 64, as assembled in the front laminate sub-assembly 15, are shown in greater detail. The battery compartment 180 is defined by the rear housing 20. The rear housing 20 includes screw bosses 812. The laminated front sub-assembly 15 includes screw bosses 816 to retain screws 92 and to thereby mechanically couple the rear housing 20 to the front laminate sub-assembly 15. The integrated circuit substrate 24, and microphone 68 are attached to the metal chassis 64. Although shown in FIG. 8, charging jack 72 is assembled to rear housing 20, held in place by support rib walls as shown in FIG. 1. Cut-outs in substrate 24 and metal chassis 64 allow spring contacts on the charging jack to mate with contacts pads on substrate 24. Tabs 804 defined on the rear housing 20 operatively couple with the slots 808 defined on the metal chassis 64 to connect the rear housing 20 and the front laminate sub-assembly 15. It will be recognized by one skilled in the art that other coupling shapes could be formed into to the front laminate sub-assembly 15 or the rear housing 20. The gasket 296 operative to seal the speaker audio port 274 is secured to the metal chassis 64. The gasket 296 may be adapted to form a first ring 822 surrounding and sealing the audio port 274 and a second ring 826, larger than and surrounding the first ring 822 and sealing an audio cavity 1104 sealing the audio cavity at the interface of the chassis 64 to the back housing 20 (see FIG. 11 discussed below). Alternatively the first and second ring could be constructed from separate gaskets, which may be more suitable to an arrangement in which audio port 274 and the interface of the chassis 64 to the back housing 20 are not in the same plane.

Figure 9:
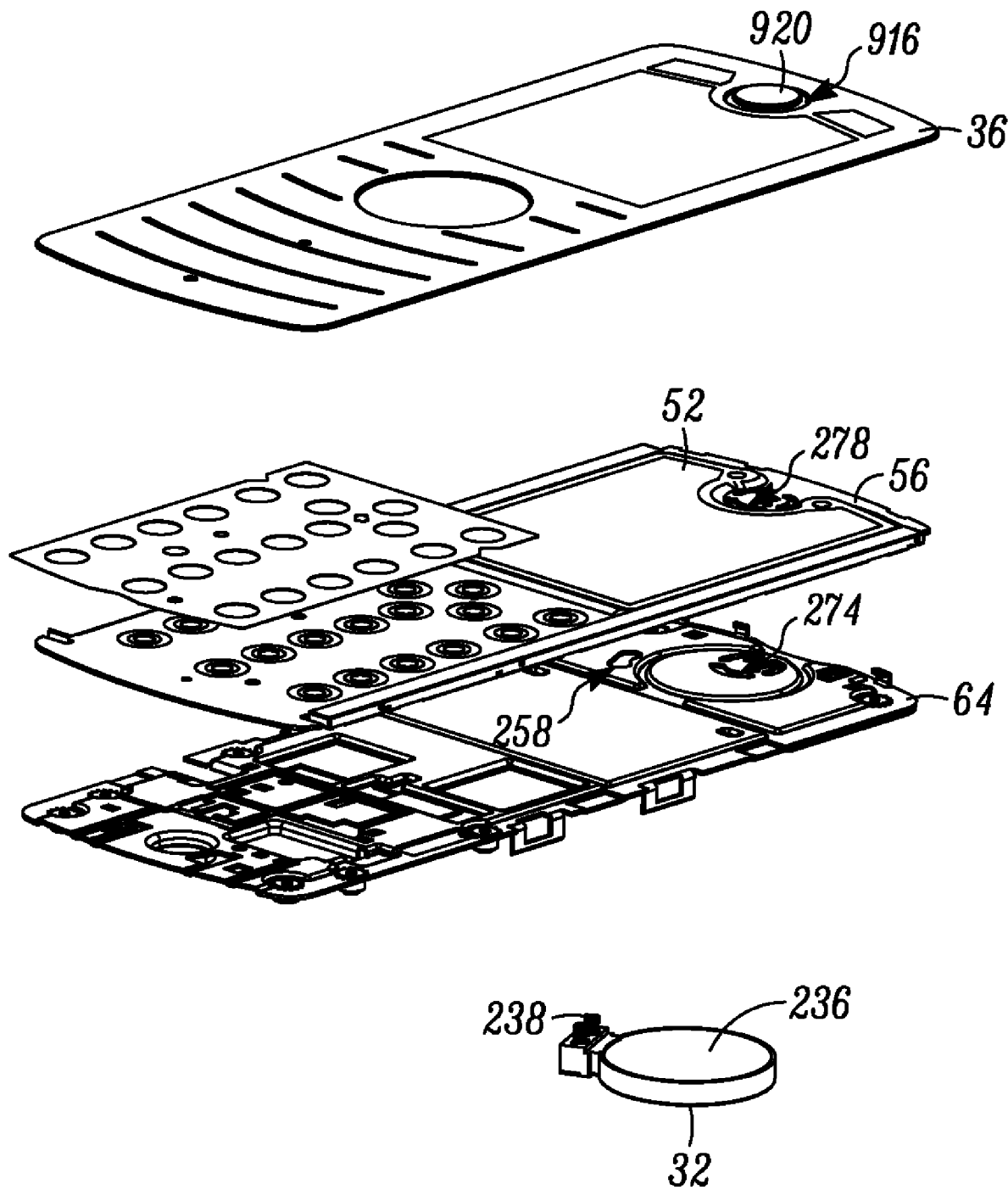
FIG. 9 is an exploded assembly view, shown from the front perspective, of part of the handset device of FIG. 1 depicting one embodiment of the invention.

FIG. 9 is an exploded assembly view, shown from the front perspective, of part of the handset device of FIG. 1 depicting one embodiment of the invention. The vertical stacking of audio ports 274 and 278 defined in the laminated layers of the metal chassis 64 and the user interface substrate 56 of the laminated front sub-assembly 15 are shown in greater detail. The display 52 partially surrounds the audio port 278 of the user interface substrate 56. The speaker 32 is assembled under the audio port stack with the electrical connector 238 ported through the electrical port 258 of the metal chassis 64. A medallion 916 with a mesh screen 920 is assembled into the sheet 36. When the sheet 36 is assembled to the user interface substrate 56, the mesh 920 forms the final audio port for the speaker 32.

Figure 10:
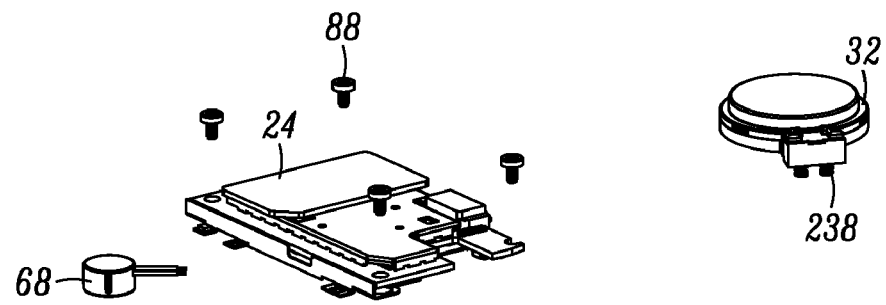
FIG. 10 is an exploded assembly view, shown from the rear perspective, of part of the handset device of FIG. 2 depicting one embodiment of the invention.
Figure 10:
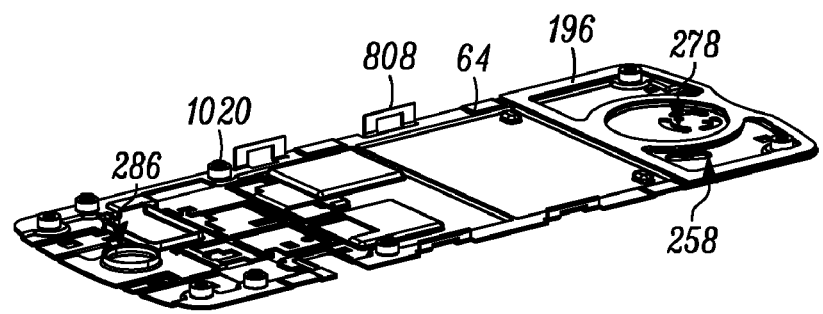
Figure 10:
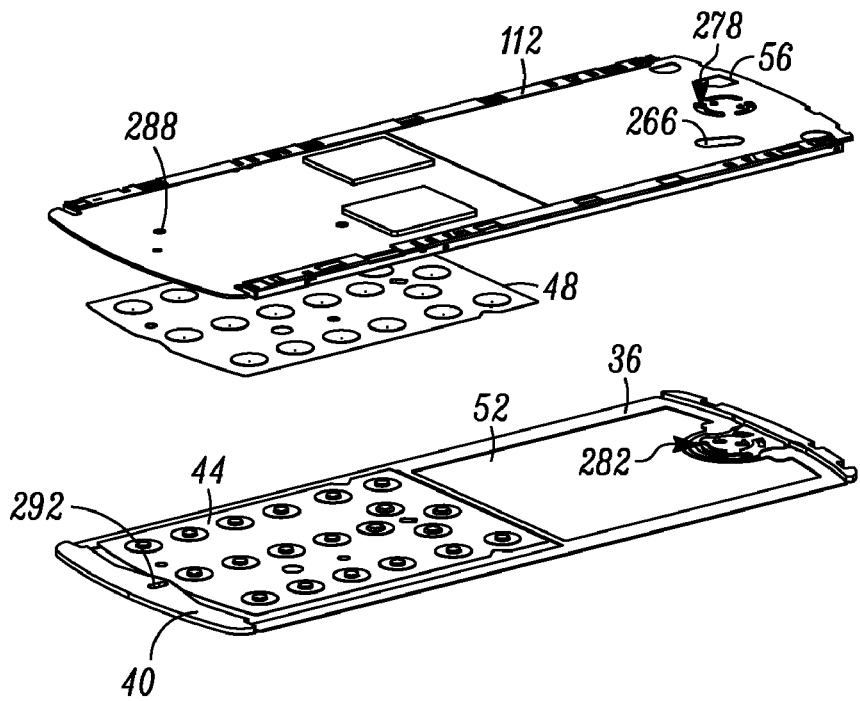

FIG. 10 is an exploded assembly view, shown from the rear perspective, of part of the handset device of FIG. 2 depicting one embodiment of the invention. The vertical stacking of speaker audio ports 274, 278, and 282 defined in the laminated layers of the metal chassis 64, the user interface substrate 56, and the sheet 36 of the laminated front sub-assembly 15, respectively, is shown in greater detail. Gasket 296 seals the audio port 274 for the speaker 32. The vertical stacking of microphone audio port portions 286 and 288, and 292 defined in the laminated layers of the metal chassis 64, and the user interface substrate 56 of the laminated front sub-assembly 15, respectively, is shown in greater detail. The adhesive sheet 40 may be applied to the perimeter of the sheet 36. The keypad substrate 44 may be coupled to the sheet 36. The keypad array 48 may be coupled between the keypad substrate 44 and the user interface substrate 56. Electrical components 1002, including drivers for the display 52, may be secured to the user interface substrate 56. The microphone 68 may be secured to the integrated circuit substrate 24. Screw bosses 1020 are defined in the metal chassis 64 to retain the screws 88 for attaching the integrated circuit substrate 24.

FIG. 11 is a widthwise cross section of the speaker cavity of an assembled version of the handset device of FIG. 8 depicting one embodiment of the invention. The diagram shows features of the audio porting and sealing in the handset device 10. The speaker 32 is coupled to the electrical contact 266 of the user interface substrate 56 by the electrical connector 238 though a combined electrical port 263 that includes the electrical port 258 defined by the metal chassis 64 and the electrical port defined by the user interface substrate adhesive layer 60. The electrical connector 238 may be a spring contact, as shown, or another type of pressure contact or other non pressure connector. Helical springs may be used, beam springs, elastomeric contacts or any suitable connector may be used. The electrical connector 238 may be gold or gold plated.

The speaker audio port 320 over the speaker 32 includes the stacked audio port portion 274 defined by the metal chassis 64, the audio port portion defined by the user interface substrate adhesive layer 60, the audio port portion 278 defined by the user interface substrate 56, and the audio port portion defined by the sheet 36. The user interface substrate adhesive layer 60 is operative to separate the combined electrical port 263 from the combined audio port 320. That is, the presence of the adhesive layer 60 prevents audio transmitted from the speaker 32 through the combined audio port 320 from leaking back into the handset device 10 through the combined electrical port 263. In addition, the gasket 296 is interposed between the speaker 32 and the metal chassis 64. The gasket 296 also prevents audio transmitted from the speaker 32 through the audio port 320 from leaking back into the handset device 10 through the combined electrical port 263.

The rear housing 20 also may be adapted to provide an audio cavity 1104 below the speaker 32. For example, the rear housing 20 may be adapted to support the speaker 32 on the internal side wall 182 of the rear housing 20 while spacing the interior surface 1108 of the base wall 230 and the interior surfaces 1112 of the external side walls 178 away from the speaker 32. The audio cavity 1104 may increased the bass response (and loudness) of the speaker 32 which may be particularly useful when using the speaker 32 as a loudspeaker. The rear housing may further be adapted to provide notches 1116 to support the gasket 296 on the exterior side walls 178. The gasket 296 may be adapted to form a first ring 822 surrounding and sealing the audio port 274 and a second ring 826, larger than and surrounding the first ring 822 that seals the audio cavity 1104. It will be recognized by one skilled in the art that other embodiments of the rear housing and gasket interface will work. Alternatively, separate walls could be formed in the rear housing to enclose the audio cavity 1104, rather than integrating these walls with the side walls of the housing. Or, an entirely separate part could be used to form the side walls 1112 and back wall 1108 of the audio cavity, such as a molded elastomeric enclosure, which may allow elimination of outer portion 826 of gasket 296. (c) Separate gaskets could be used to seal the speaker and the audio cavity. The gasket 296 may define a first ring seal around the speaker 32 and a second ring around the first ring to seal around the audio cavity 1104 (see FIG. 11) as is shown, for example, in FIG. 8. The top antenna 76 and integral connectors 192 may be located within audio cavity 1104, and coupled through openings in the metal chassis 64 and substrate adhesive layer 60 to the user interface substrate 56, in a similar manner as the speaker 32 and electrical connectors 238.

Figure 13:
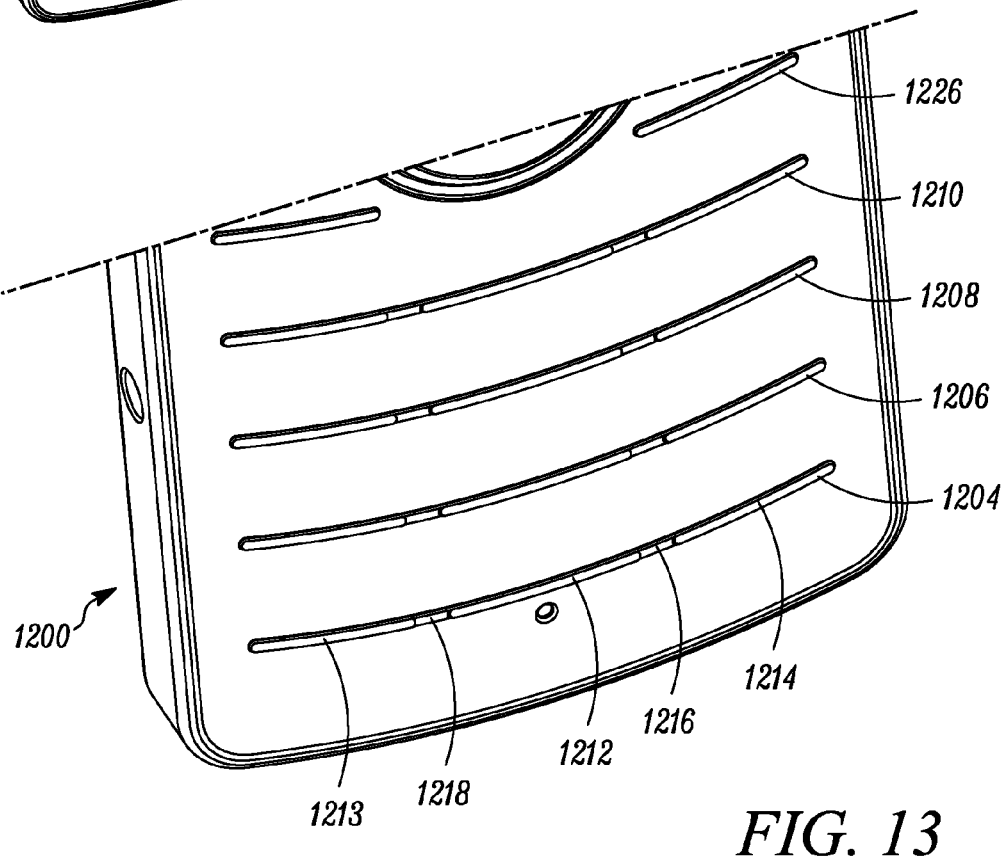
FIG. 13 is a front view of a phone of FIG. 1 assembled illustrating one example of a keypad in accordance with one embodiment of the invention.

Referring to FIGS. 12 and 13, a keypad 1200 includes a plurality of keys 1202 shown here to be in a bell keypad configuration having the numbers 0-9 in addition to a "*", "#" in addition to function keys such as power keys and other keys as shown. However, it will be recognized that any suitable keypad configuration may be used. Also referring to FIG. 1, the keypad 1200 includes a plurality of key dividers 1204, 1206, 1208, 1210 that are positioned with respect to the plurality of keys 1202 and are found on the keypad substrate 44 (see FIG. 1). Each of the plurality of key dividers 1204-1210 includes raised guide portions 1212, 1213 and 1214 and tactile cue portions 1216 and 1218 that are interposed between the plurality of raised guide portions 1212, 1213 and 1214. However, it will be recognized that any suitable number (fewer or more) of raised guide portions and tactile cue portions may be used. In this example, the number keys 1-9 are positioned in horizontal rows 1220 and the keys in the horizontal rows are positioned between parallel arced key dividers such as key dividers 1206 and 1208, or key dividers 1208 and 1210 respectively.

In this example, the keypad 1200 also includes a segmented key divider 1222 which is positioned above a plurality of keys, in this example the first row of number keys 1, 2, 3. The segmented key divider 1222 shows two segmented portions 1224 and 1226. Also in this example, the segmented key divider 1222 is positioned adjacent to the navigation key 168. Other key dividers 1230 and 1232 may also be used as desired.

The tactile cue portions 1218 and 1216 provide lateral tactile cues for a finger or other object in the horizontal direction. In the example shown, a set of parallel arced key dividers also provides an arced rail between which a finger may be guided. The tactile cue portions 1216 and 1218 as shown in this example, are recessed with respect to the plurality of raised guide portions. However, it will be recognized that the tactile cue portions 1218 and 1216 may also be raised with respect to the plurality of raised guide portions 1214, 1213 and 1212. As noted above, the keypad 1200 may be made in any suitable manner and in this example, includes the sheet 36, the keypad substrate 44, the keypad array 48 and the patterned contacts 108 secured in a manner to facilitate operation. The sheet 36 includes keypad indicia thereon and slots operatively sized to receive the plurality of arced key dividers. Although arced key dividers are shown, straight key dividers or other suitably shaped key dividers may also be used.

As also shown, the tactile cue portions 1216 and 1218 are offset from centers of the keys. For example, the number 7 along with the letters "pqrs" associated with a key are centered with respect to its corresponding raised guide portion and the corresponding tactile cue portion is offset from the center of the key.

Among other advantages, keypads with single arced key divisions with localized protrusions or recessions can provide tactile cues across horizontal rows of keys. As such, horizontal tactile cues are integrated into a single key division allowing for a improved user experience. Other advantages will be recognized by those skilled in the art.

The above detailed description of the invention and the examples described therein have been presented for the purposes of illustration and description only and not by limitation. It is therefore contemplated the present invention cover any and all modifications, variations, or equivalents that fall in the spirit and scope of the basic underlying principles disclosed above and claimed herein.

What is claimed is:

1. A keypad comprising:
   a plurality of keys arranged in a bell keypad layout;
   a plurality of arced key dividers, operatively positioned above and below keys in a respective row of keys, wherein each of the plurality of arced key dividers includes a plurality of raised guide portions and a plurality of tactile cue portions interposed between the plurality of raised guide portions that provide lateral tactile cues; and
   an elastomeric sheet comprising the plurality of arced key dividers, a keypad dome array that supports the elastomeric sheet and a keypad sheet having key pad indicia thereon and slots operatively sized to receive the plurality of arced dividers.

* * * * *